Sept. 11, 1934.  A. O. JAEGER  1,972,937
PROCESS FOR EFFECTING CATALYTIC REACTIONS
Filed March 5, 1930    4 Sheets-Sheet 1

INVENTOR
Alphons O. Jaeger
BY
ATTORNEY

Sept. 11, 1934. A. O. JAEGER 1,972,937
PROCESS FOR EFFECTING CATALYTIC REACTIONS
Filed March 5, 1930 4 Sheets-Sheet 2
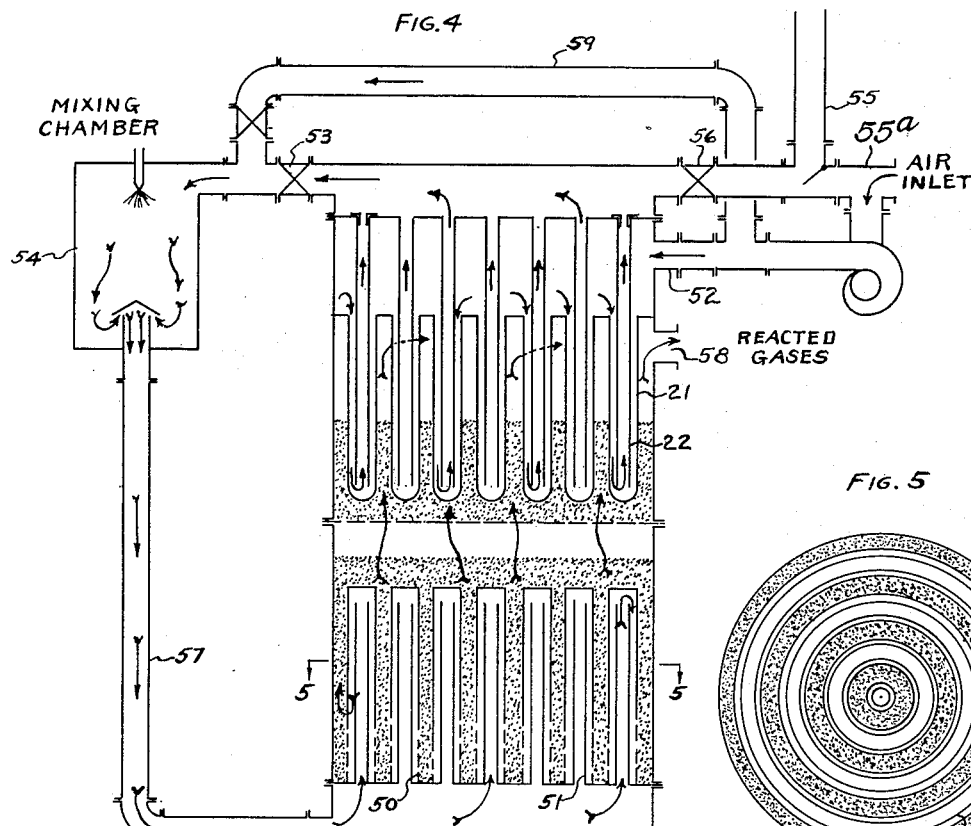
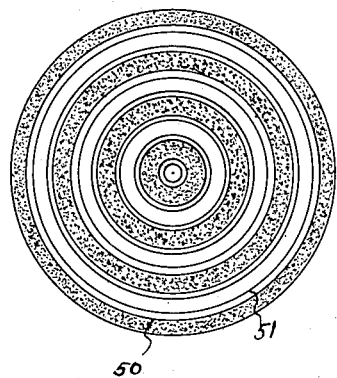
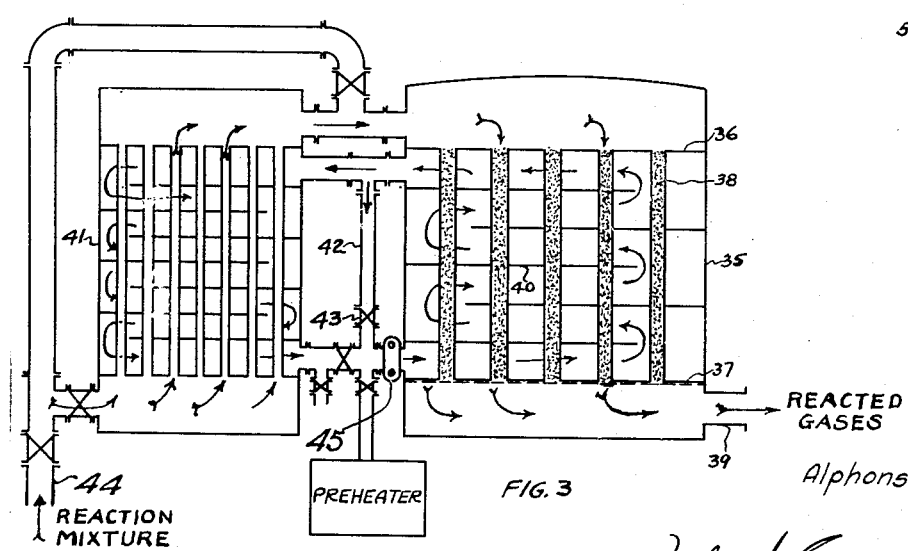
Inventor
Alphons O. Jaeger
By Robert Ames Norton
Attorney

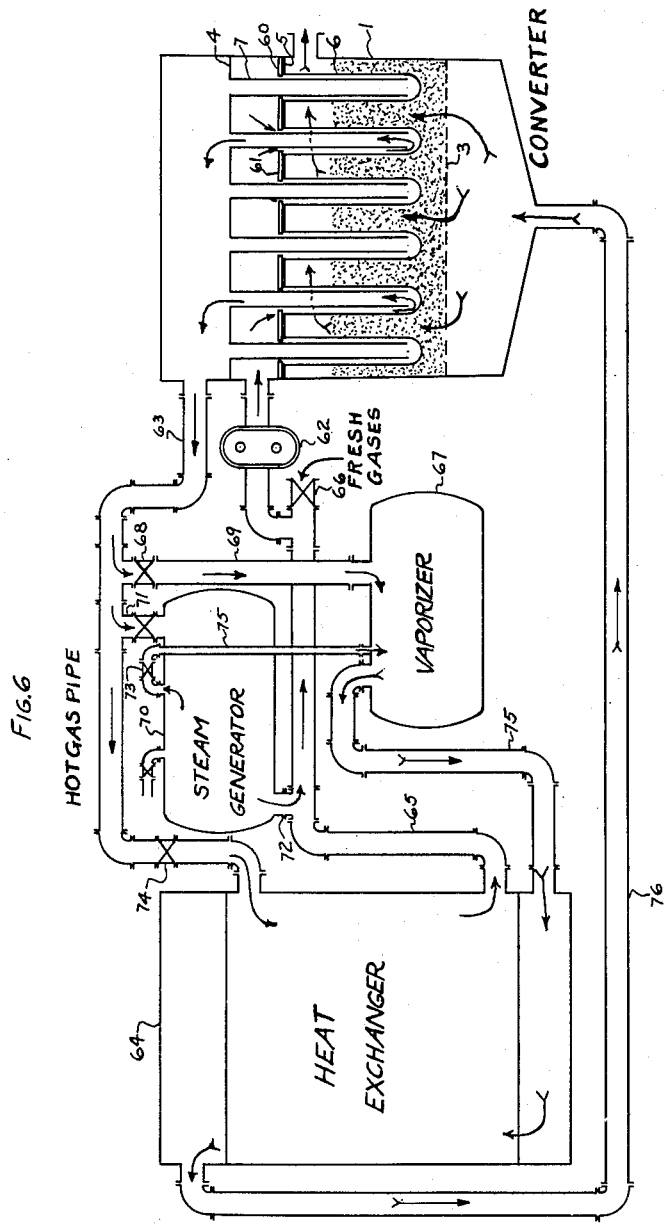

Sept. 11, 1934.  A. O. JAEGER  1,972,937
PROCESS FOR EFFECTING CATALYTIC REACTIONS
Filed March 5, 1930   4 Sheets-Sheet 4
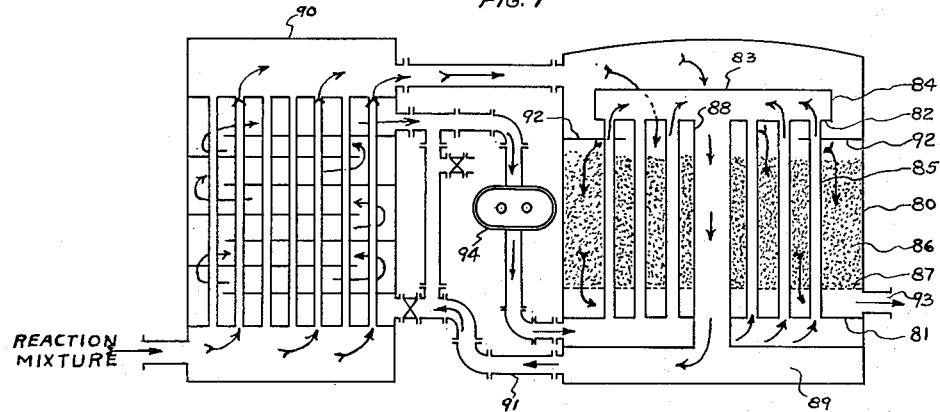
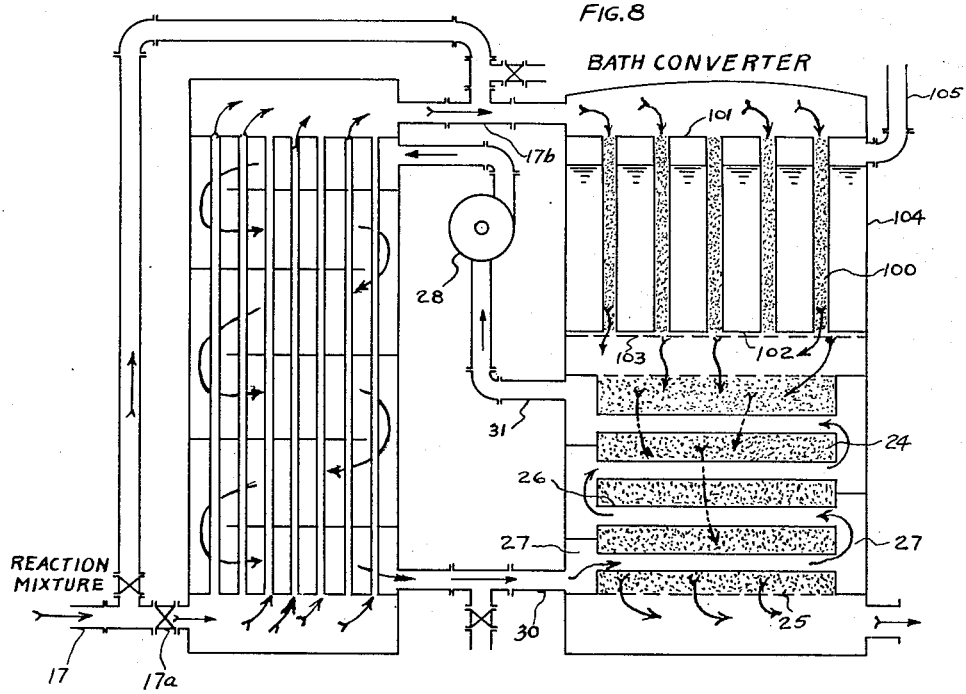
Inventor
Alphons O. Jaeger
By Robert Ames Norton
Attorney Patented Sept. 11, 1934

1,972,937

UNITED STATES PATENT OFFICE 1,972,937

PROCESS FOR EFFECTING CATALYTIC REACTIONS

Alphons O. Jaeger, Mount Lebanon, Pa., assignor to The Selden Company, Pittsburgh, Pa., a corporation of Delaware Application March 5, 1930, Serial No. 433,438

2 Claims. (Cl. 23—176)

This invention relates to processes of temperature regulation in the carrying out of catalytic reactions.

In my prior application Serial No. 327,853, filed December 22, 1928, now Patent 1,945,353 I have shown and described converter systems wherein partial control of the catalyst temperature is effected by transferring heat to a gas, a part or all of which is later caused to transmit the heat so acquired to certain components of the reaction mixture to be passed over the catalyst. I have now found that this principle can be applied in various ways, not only to effect a complete as well as partial temperature control of the temperatures within the catalyst masses and/or reaction gases used, but also to bring about suitable regulation of the temperature of the incoming reaction gas mixtures in order that full efficiency of the catalyst may be maintained throughout the entire converter.

I have also found that while it is sometimes desirable to bring at least a part of the cooling gas directly into contact with components of the reaction mixture, either with or without recirculation, as described in my prior application referred to, modifications of this principle bring out many important features of control and heat economy and flexibility of operation. For example, if an independent temperature regulating medium is caused to recirculate in heat exchange relation but out of contact with a part or all of the catalyst masses or converters and through an outside temperature regulating system, as described in my prior application Serial No. 420,656, filed January 14, 1930, now Patent 1,942,817, heat exchange can be effected from the recirculating temperature regulating medium to one or more of the desired components of the reaction gas mixture. In many cases this method of procedure presents important operating features; not only is the temperature control a more flexible one, for the reasons described in my last application above referred to, but by suitable design of the apparatus the gases within the heat exchange elements in contact with the catalyst and/or reaction mixture can be recirculated and their pressure maintained above that of the reaction mixtures passing through the catalyst. Any leaks that may occur in the heat exchangers will result only in the introduction of a small amount of the recirculating medium, which is usually air, into the reaction mixture.

It will be apparent that the principles of the present invention may be applied to reactions which are endothermic or not highly exothermic, such as splitting reactions, rehydrations, dehydrogenations, or the synthesis of ammonia. Such reactions sometimes require the addition of outside energy in the form of heat throughout their course, and it is often advantageous to supply this outside heat by means of the same gas that is used to preheat the desired components of the reaction mixture. The most important applications, however, are probably those involving moderately or strongly exothermic reactions, where the efficient temperature control of the circulating gaseous medium and the economics obtained by the transfer of heat are most desirable. For example, in the catalytic oxidation of sulfur dioxide to sulfur trioxide, which is moderately exothermic, the heat taken up by the circulating medium is readily transferred to the incoming burner gases, while in strongly exothermic organic oxidations the heat not used in preparing and preheating the reaction mixture can be readily employed for many useful purposes, e. g. for generating steam.

The principles of the present invention may be applied to the most various vapor phase catalytic reactions, such as the oxidation of benzol, toluol, phenol, tar phenols or furfural to maleic acid and fumaric acid; cresol to salicylaldehyde and salicylic acid; toluol and the various halogen and nitro substituted toluols to the corresponding aldehydes and acids; xylenes, pseudocumene, mesitylene, paracymene and other derivatives to the corresponding aldehydes and acids; naphthalene to alphanaphthaquinone, phthalic anhydride and maleic acid; phthalic anhydride to maleic acid and fumaric acid; anthracene to anthraquinone; phenanthrene to phenanthraquinone, phthalic anhydride and maleic acid; acenaphthene to acenaphthalene, acenaphthaquinone, bisacenaphthylidenedione, naphthaldehydic acid, naphthalic anhydride and hemimellitic acid; fluorene to dehydrogenated fluorenes to fluorenone; eugenol and isoeugenol to vanillin and vanillic acid; methyl alcohol and methane to formaldehyde; ethyl alcohol to acetic acid; ethylene chlorhydrine to chloracetic acid.

Organic oxidations in which impurities are selectively burned out or transformed into easily removable substances also require accurate temperature control; examples of such reactions are the purification of crude anthracene or phenanthrene by the selective catalytic combustion of carbazol, the purification of crude naphthalene, crude mononuclear aromatic hydrocarbons and crude aliphatic compounds, such as high sulfur oils and motor fuels.

Ammonia from coal tar may also be purified by selective oxidation of organic and other impurities and requires a good temperature control. The apparatus is also suitable for the oxidation or synthesis of ammonia.

The features of the present invention may also be applied to other types of exothermic vapor phase catalyses, such as catalytic reductions, hydrogenations, condensations and the like, and for high pressure reactions and special reactions such as the catalytic purification of gases, catalytic water gas process, synthesis of hydrocyanic acid, production of reduction products of oxides of carbon, such as, for example, methanol, various motor fuels and the like. Examples of reductions are:—reduction of nitro compounds to amines, for instance nitro benzol to aniline, etc. the reduction of phenols to cyclohexanols, naphthalene to tetraline, etc., crotonaldehyde to normal butyl alcohol, acetaldehyde to ethyl alcohol, etc.

The principles of the present invention are particularly applicable to the contact sulfuric acid process where the effect of the temperature of various portions of the catalyst masses or converters on the equilibrium of the reaction is so pronounced. By the application of outside cooling media to the control of this reaction it is not only possible to maintain optimum operating conditions throughout all portions of the converter or converters, but it is also possible to apply the heat so removed for the preheating of the incoming sulfur dioxide gases in an efficient and economical manner. A more detailed description of some of the figures of the drawings will be made particularly in connection with the contact sulfuric acid process, but it should be understood that the principles stated with regard to this process is applicable to many other vapor phase catalyses such as those enumerated above.

In the accompanying drawings, which are to be considered as illustrative only, and to which the invention is not limited:

Fig. 1 represents a single layer converter having heat exchange elements of the double countercurrent type arranged for use with a temperature regulating medium, the design being such that heat is given up to the incoming reaction gas mixture;

Fig. 2 shows a converter system in which a plurality of catalyst layers or converters is used, the first being designed to give up heat directly to the incoming reaction gas mixture by means of double countercurrent heat exchange elements embedded in the catalyst and the second by means of independent cooling gases which are recirculated through tubes embedded in the catalyst layer and through an outside heat exchanger;

Fig. 3 shows the use of the present invention for preheating incoming reaction mixtures as applied to a converter of the Knietsch type;

Fig. 4 is a converter system in which the first catalyst layer or converter is cooled by means of the incoming reaction gas mixture which is passed through ring shaped double countercurrent heat exchange elements and the second layer of which is cooled by an independent flow of air or other cooling medium which is to be used as one component in making up the reaction mixture;

Fig. 5 is a section of the first catalyst layer taken on the line 5—5 of Fig. 4;

Fig. 6 shows a system in which the invention is applied to exothermic organic reactions, the heat of the reaction being used partly to vaporize and preheat components of the reaction mixture and partly to generate additional steam;

Fig. 7 shows the application of the invention to a vertical tube or Audianne type of converter; and Fig. 8 shows a modification in which the invention is applied to a gas cooled second catalyst layer or converter operating in conjunction with a first converter of the bath type, the system being designed for use in carrying out reactions that are strongly exothermic in their first zones.

Figure 1:
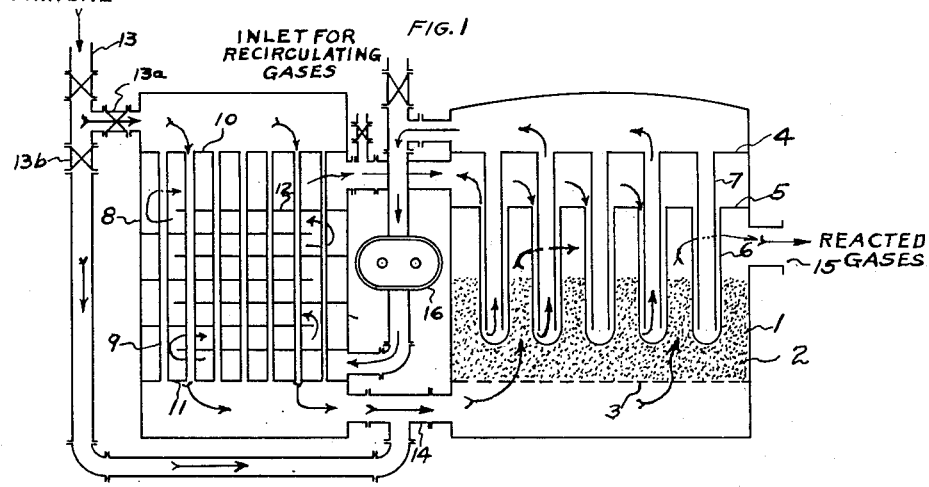

In the modification of Fig. 1 the converter consists of an outer shell 1 supporting the upper and lower tube sheets 4 and 5, and the catalyst 2 upon the catalyst screen 3. From the lower tube sheet 5 closed end tubes 6 extend into the catalyst while from the upper tube sheet 4 open end tubes 7 extend nearly to the bottom of the closed end tubes 6.

The heat exchanger 8 may be of any suitable or preferred construction, but is shown as of the ordinary boiler type construction, the heat exchange tubes 9 being retained between upper and lower tube sheets 10 and 11, a longer travel of the heating gases also being obtained by means of the baffles 12. The incoming reaction mixture enters at 13 and all or any portion of it may be passed through the tubes 9 of the heat exchanger or by-passed therearound by suitable adjustment of the valves 13a and 13b. The preheated gases then enter the lower part of the converter at 14 and the reacted gases leave at 15. The independent cooling medium which may advantageously be air is recirculated by the pump 16 through the heat exchanger 8 and through the tubes 6 and 7 in the direction of the arrows. Such features as insulation and the use of orifice plugs or similar means, such as those described in my patent No. 1,685,672 to counteract radiation through the converter shell have been omitted for the sake of clearness, although it is understood that they will be applied in actual practice wherever needed.

This apparatus is particularly suitable for the oxidation of $SO_2$ to $SO_3$ and for ammonia synthesis, these being reactions in which no more heat is provided than can be taken up by the incoming gases. In carrying out the latter reaction it is advisable to reverse the pump 16 and pass the circulating gases in the opposite direction from that shown in order to avoid blowing out the reaction at the tail end of the converter. It is of course understood that high pressure equipment will be used.

Figure 2:
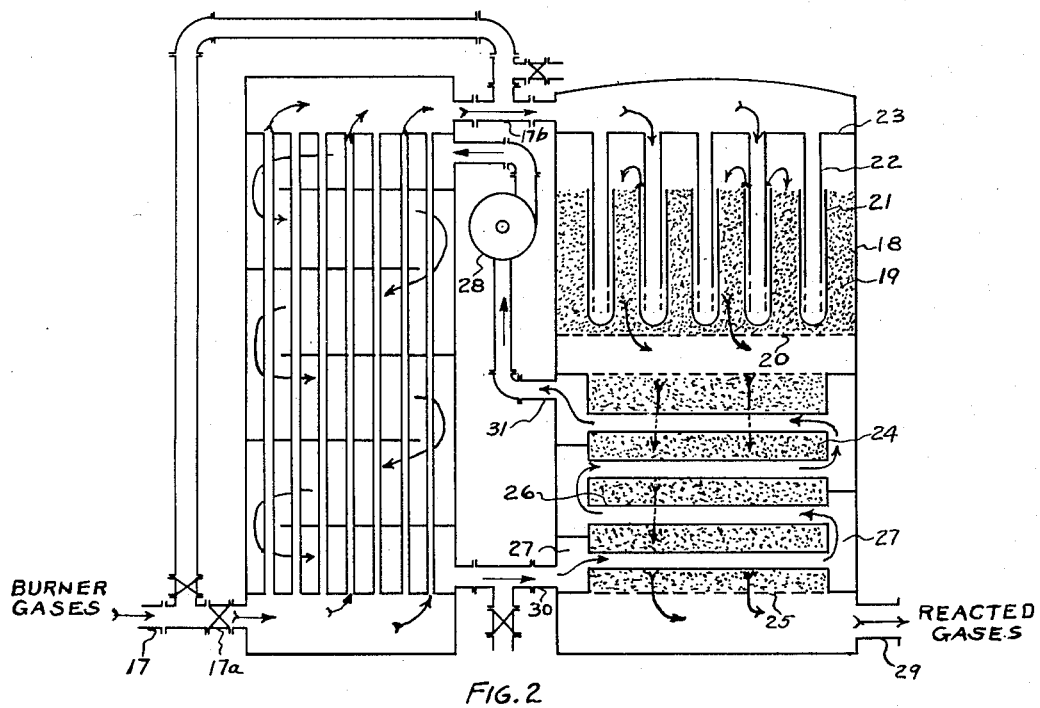

In the modification shown in Fig. 2 the construction and operation of the heat exchanger is the same as that of Fig. 1. The burner gases are admitted at 17 and all or a part pass into the exchanger through the valve 17a and leave through the pipe 17b leading to the upper portion of the converter, a suitable bypass being provided for closer temperature regulation. The converter consists of an outer shell 18, with top and bottom pieces, an upper converter or catalyst layer of the double countercurrent heat exchange type and a lower converter or catalyst layer of the straight tube type. The upper catalyst layer 19 is retained on the upper catalyst screen 20 with the closed end tubes 21 embedded therein. The open end tubes 22 are suspended from tube sheet 23 in the usual manner and the incoming reaction mixture is caused to pass first in indirect and then in direct heat exchange relation with the catalyst and then down through the catalyst bed itself. The lower catalyst layer or converter 24 is retained on the lower catalyst screen 25 and has embedded in it tubes 26 connected at their ends to manifolds 27. The manifolds are so arranged that the incoming cooling gases, which are circulated by means of the pump 28, are passed in one direction through the lowest row of parallel tubes and in the opposite direction through the next higher row until the top row has been reached. The partially converted reaction gas mixture leaving the upper catalyst layer or converter 19 is passed through the lower converter 24, where the reaction is completed and the reacted gases leave at 29. The cooling gases enter the manifolds 27 at 30 and leave at 31, being passed countercurrent to the flow of the reaction mixture both in the outside heat exchanger and in the heat exchange tubes 26.

The modification of Fig. 3 is similar to that of Fig. 1 with the exception that a converter of the well-known Knietsch type is used, in which the catalyst is retained in tubes and the cooling gases are passed around the tubes in countercurrent to the flow of the reaction mixture. The converter consists of a converter shell 35 with top and bottom pieces and upper and lower tube sheets 36 and 37 between which the catalyst tubes 38 extend. The cooling gases are recirculated by the pump 45 over the baffles 40 in the direction of the arrows and then through the heat exchanger 41 which is of the usual construction. By adjustment of the valve 43 any desired portion of these gases may be bypassed through the pipe 42 without passing through the heat exchanger since this pipe is between the pump and the heat exchanger and additional heat may be added to the system if necessary by the introduction of gases from the preheater. The incoming reaction gas mixture enters at 44 and passes in the direction of the arrows through the heat exchanger and down through the catalyst tubes 38, a suitable portion being bypassed if desired, and leaves the converter at 39. It is understood that the by-pass 42 shown in this system may be applied to any of the other systems if desired or a suitable cooling by-pass may be used if more heat is given off by the reaction than can be absorbed by the incoming reaction mixture.

Fig. 4 illustrates a converter system, the first catalyst layer or converter of which is cooled by the incoming reaction mixture as in Fig. 2 but in which the double countercurrent heat exchange elements are in the form of concentric rings instead of concentric tubes. The heat exchange elements of the second catalyst layer or converter of this system are structurally the same as those of Fig. 2, but the transfer of heat from this catalyst layer to the reaction mixture is made to take place by actual mixing of the temperature regulating medium, which in this modification is usually air, with other components of the reaction mixture. The bottom converter is provided with concentric annuli 50 and 51, the catalyst being placed in the spaces between the annuli 50. These annuli are also provided with perforations at their open ends so that gases may pass out into the catalyst. It will be noted that the flow of the gases is the same as in the modification shown in Fig. 2 that is to say the gases first pass between the annuli 51 in indirect heat exchanging relation with the catalyst, then reverse their flow and pass down in the annular spaces between the annuli 50 and 51 in direct heat exchanging relation with the contact mass and with the incoming gas, and then, after reversal of flow, through the perforations and up through the catalyst layer. This construction possesses some advantages as the rings nest without the use of tube sheets and the catalyst in the annuli presents a larger surface to the heat exchange elements than is the case with the design shown in Fig. 2. Compensation for converter shell cooling may be effected by increasing the thickness of catalyst annuli from the center to the periphery or by providing suitable restrictions in the gas flow through the various portions.

Cooling in the upper catalyst layer is preferably effected by means of air which under ordinary operating conditions enters at 52, passes through the outer and inner concentric tubes 21 and 22 and exits through the valve 53 into the chamber 54. This chamber is shown diagrammatically as a vaporizing chamber, but it is understood that any suitable device whereby the heated gases are mixed with components of the reaction mixture may be substituted. For example in the contact sulfuric acid process the chamber 54 may consist of a sulfur burner, or a mixer for mixing the heated air with sulfur dioxide gases already prepared and purified. When recirculation of the air is desired, as in first heating up the converter or in the case where only reactions that are relatively s ightly exothermic are to be carried out, it is only necessary to open valve 56, and close the valve 53 and to close the intake pipes 55 and 55a. To send additional air to chamber 54 the by-pass 59 is used. The reaction mixture circulates from the mixing chamber or device 54 through the pipe 57 and leaves the upper converter at 58.

The system of Fig. 6 shows an application of the invention to strongly exothermic reactions, such as the oxidation of organic compounds to intermediate products, and is a good illustration of the flexibility of the system. The converter 1 is similar to that shown in Fig. 1, the parts being given similar reference numerals, with the exception that the perforated plate 60 is shown covering the lower tube sheet 5. Orifices 61 in this plate increase in size from the periphery towards the center and serve to cause a decreased flow of cooling gases through the outer heat exchange elements as described in my Patent No. 1,685,672, thereby compensating for uneven cooling through the converter shell. It is to be understood, of course, that any other suitable or preferred type of converter may be used in this relation if desired, for example one of the bath type as shown in Fig. 8. The hot gases from the converter will recirculate by means of pump 62 through the pipe 63 and the heat exchanger 64 and back by way of the pipe 65, additional fresh gases being admitted through the valve 66. The substance to be oxidized, for example naphthalene or anthracene, is contained in the vaporizer 67 and the hot gases necessary for this purpose are supplied from the hot gas pipe 63 through the valve 68 and pipe 69. Steam generator 70 is placed in parallel between the pipes 63 and 65 and connected thereto by pipes 71 and 72 and excess heat that is not taken up by the incoming reaction mixture in the heat exchanger 64 is used in the generation of steam to aid in liquefying the anthracene or other substance in the vaporizer or for other purposes. The proportion of the total heat to be taken up in the heat exchanger 64 and by the steam generator 70 will, of course, depend upon the nature of the reaction, the substance to be oxidized and other operating conditions and is controlled by suitable adjustment of the valves 73 and 74. Steam from the generator is passed into the vaporizer by means of the steam pipe 75.

The mixture of hydrocarbon vapors and air from vaporizer 67, the composition of which is adjusted by control of the valve 68, is admitted to the heat exchanger through pipe 75 and passes by way of pipe 76 to the converter where it is reacted. It will be seen that in this system an excellent heat balance is maintained even though the reaction may be of the most strongly exothermic type, for all of the heat given off by the reaction that is not necessary in preparing and preheating the reaction mixture is readily utilized for the formation of steam for other purposes, and the steam generator acts as an effective heat reservoir for the absorption and storage of heat not needed elsewhere in the system.

The modification of Fig. 7 is similar to Figs. 1 and 3 with the exception that a converter of the Audianne or straight tube type is used. This converter consists of a shell 80 with top and bottom pieces, a lower tube sheet 81 supported therein, and an upper tube sheet 82 that is closed off from the incoming reaction gas mixture by top and side pieces 83 and 84 to form a closed chamber. Heat exchange tubes 85 extending between the upper and lower tube sheets are designed for the passage of a cooling gas in heat exchanging relation with the catalyst mass 86 that is retained on the catalyst screen 87 in the usual manner. The cooling gases that pass upwardly through the tubes are received in the upper chamber and pass downwardly through the large central tube 88 to a chamber 89 at the bottom of the converter from which they pass into the heat-exchanger 90 through the pipe 91. The incoming reaction gas mixture is passed through the heat exchanger as in Figs. 1 and 3 and is further preheated by contact with the upper chamber in which the hot gases from the heat exchange tubes have been received and then passes downwardly through the catalyst mass, its flow being distributed by means of baffles 92, and leaves at 93. The cooling gas is recirculated through the system by means of the pump 94.

Fig. 8 shows the application of the invention to a converter system in which the first catalyst layer or converter is of the bath type, that is to say one in which the catalyst is retained in tubes surrounded by a bath. The liquid of this bath may be one that boils at or below reaction temperatures and conducts away the exotherm of the reaction as latent heat of vaporization or it may be a non-boiling liquid which removes heat from the catalyst tubes by an increase in its temperature and gives up this heat to suitable cooling surfaces. In the construction shown the converter consists of catalyst tubes 100 extending between upper and lower tube sheets 101 and 102, the catalyst therein being retained by catalyst screen 103. The liquid surrounding the tubes is retained within the converter shell 104 in a bath chamber from which pipes 105 extend to reflux condensers. The remaining structure and the operation of the apparatus is the same as that shown in Fig. 2, with the exception that the converter system of Fig. 8 is designed primarily for organic oxidations or other highly exothermic reactions and suitable adjustments will be made accordingly in the design and construction of this apparatus.

This application is in part a continuation of my prior applications, Serial Nos. 327,853, filed December 22, 1928, now Patent 1,945,353 and 420,656, filed January 14, 1930, the latter now being Patent #1,942,817.

In the drawings the flow of the cooling gas is denoted by plain arrows, and the flow of the reaction gas mixture is denoted by feathered arrows.

What is claimed as new is:

1. A process of effecting catalytic reactions producing heat greater than the heat required to preheat the reaction gases from atmospheric temperature, which comprises passing a gas in heat exchange relation with a catalyst, bringing a portion only of said gas into heat exchange relation with at least one component of the reaction mixture and subsequently passing said reaction mixture over said catalyst at reaction temperatures.

2. A process of effecting catalytic reactions which are strongly exothermic and develop an amount of heat greater than that required for preheating the reaction gas from room temperature to reaction temperature which comprises passing a gas through heat exchange elements, in heat exchange relation with a catalyst layer in a converter of the catalyst layer type, passing a portion of the heated gas in heat exchange relation with at least one component of the reaction mixture, and passing a further portion of the heated gas through a vapor generator in heat exchange relation with a vaporizable liquid whereby the heat of the gas is utilized in generating vapor, and passing the reaction mixture through the catalyst layer.

ALPHONS O. JAEGER.